United States Patent
Myers et al.

(10) Patent No.: US 9,016,752 B2
(45) Date of Patent: Apr. 28, 2015

(54) VEHICLE POCKET ASSEMBLY

(71) Applicant: Honda Motor Co. Ltd., Tokyo (JP)

(72) Inventors: Ronald W. Myers, Dublin, OH (US);
Neal W. Luginbill, Marysville, OH (US); Yousuf Riad, Dublin, OH (US);
Stephen Walser, Urbana, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/802,218

(22) Filed: Mar. 13, 2013

(65) Prior Publication Data

US 2014/0265420 A1 Sep. 18, 2014

(51) Int. Cl.
*B60R 7/06* (2006.01)

(52) U.S. Cl.
CPC .......................................... *B60R 7/06* (2013.01)

(58) Field of Classification Search
CPC ............ B60R 2011/0007; B60R 11/00; B60R 11/0241; B60R 11/0252
USPC ............ 296/37.8, 24.3, 37.1, 37.9, 37.12, 70, 296/24.34
See application file for complete search history.

(56) References Cited

U.S. PATENT DOCUMENTS

| | | | |
|---|---|---|---|
| 5,996,866 A | 12/1999 | Susko et al. | |
| 6,379,178 B1 | 4/2002 | Jones, III et al. | |
| 7,194,087 B2 | 3/2007 | Luginbill et al. | |
| 7,413,229 B2 | 8/2008 | Kukucka et al. | |
| 7,505,583 B2 | 3/2009 | Rohrbach | |
| 7,784,843 B2 * | 8/2010 | Lota et al. | 296/24.34 |
| 8,104,816 B2 | 1/2012 | Lupton, III et al. | |
| 8,172,293 B2 | 5/2012 | Lota et al. | |
| 2009/0174209 A1 * | 7/2009 | Lota et al. | 296/24.34 |
| 2009/0178844 A1 | 7/2009 | Derocher et al. | |
| 2011/0156418 A1 | 6/2011 | Thorsell et al. | |

* cited by examiner

*Primary Examiner* — Joseph D Pape
*Assistant Examiner* — Dana Ivey
(74) *Attorney, Agent, or Firm* — Rankin, Hill & Clark LLP

(57) ABSTRACT

A pocket assembly for accommodating a portable electronic device in a vehicle includes a storage compartment and at least one port disposed within the storage compartment for operatively connecting to the portable electronic device. The storage compartment is disposed within the vehicle and is defined by at least one wall. An aperture is defined in the at least one wall for receiving an excess portion of a connecting cord adapted to operatively connect the portable electronic device to the at least one port.

14 Claims, 4 Drawing Sheets

VEHICLE POCKET ASSEMBLY

BACKGROUND

In recent years, vehicles are equipped with more and more features provided to improve the vehicle owner or driver's experience with the vehicle as relates to portable electronic devices, such as mobile phones, music players, etc. For example, many vehicles include one or more ports for operatively connecting to a portable electronic device to one or more systems of the vehicle. The port may provide vehicle power to the portable electronic device for charging and/or may enable communications between the portable electronic device and the vehicle. For example, music from the portable electronic device can be played through the vehicle's sound system when the portable electronic device is connected to an appropriate port.

Some vehicles include a compartment or recess for accommodating a portable electronic device and further include some means for routing a connecting cord connectable to the portable electronic device and the vehicle. For example, a compartment may include a port therein and a door for selectively closing the compartment. The housing defining the compartment or the door can include an aperture for routing the connecting cord from the port disposed within the compartment to the portable electronic device when the compartment is closed and the portable electronic device resides outside the compartment. In another arrangement, a portable electronic device is received within a pocket and a connecting cord connected to the portable electronic device passes through an aperture or passage into another compartment, which may itself include a port to which the connecting cord can be removably secured.

SUMMARY

According to one aspect, a pocket assembly for accommodating a portable electronic device in a vehicle includes a storage compartment and at least one port disposed within the storage compartment for operatively connecting to the portable electronic device. The storage compartment is disposed within the vehicle and is defined by at least one wall. An aperture is defined in the at least one wall for receiving an excess portion of a connecting cord adapted to operatively connect the portable electronic device to the at least one port.

According to another aspect, a console pocket assembly for a vehicle includes a storage compartment having a base wall for supporting a portable electronic device and a port disposed within the storage compartment that is connectable to the portable electronic device via a connecting cord. An aperture is defined through the base wall for receiving a section of the connecting cord to thereby declutter the storage compartment.

According to a further aspect, a vehicle pocket assembly includes a housing defining a storage compartment for receiving a portable electronic device and at least one port disposed within the storage compartment for connection to the portable electronic device via a connecting cable. An aperture is defined through a lower wall of the housing for receiving an excess portion of the connecting cable therethrough to remove the excess portion from the storage compartment.

DETAILED DESCRIPTION

Figure 1:
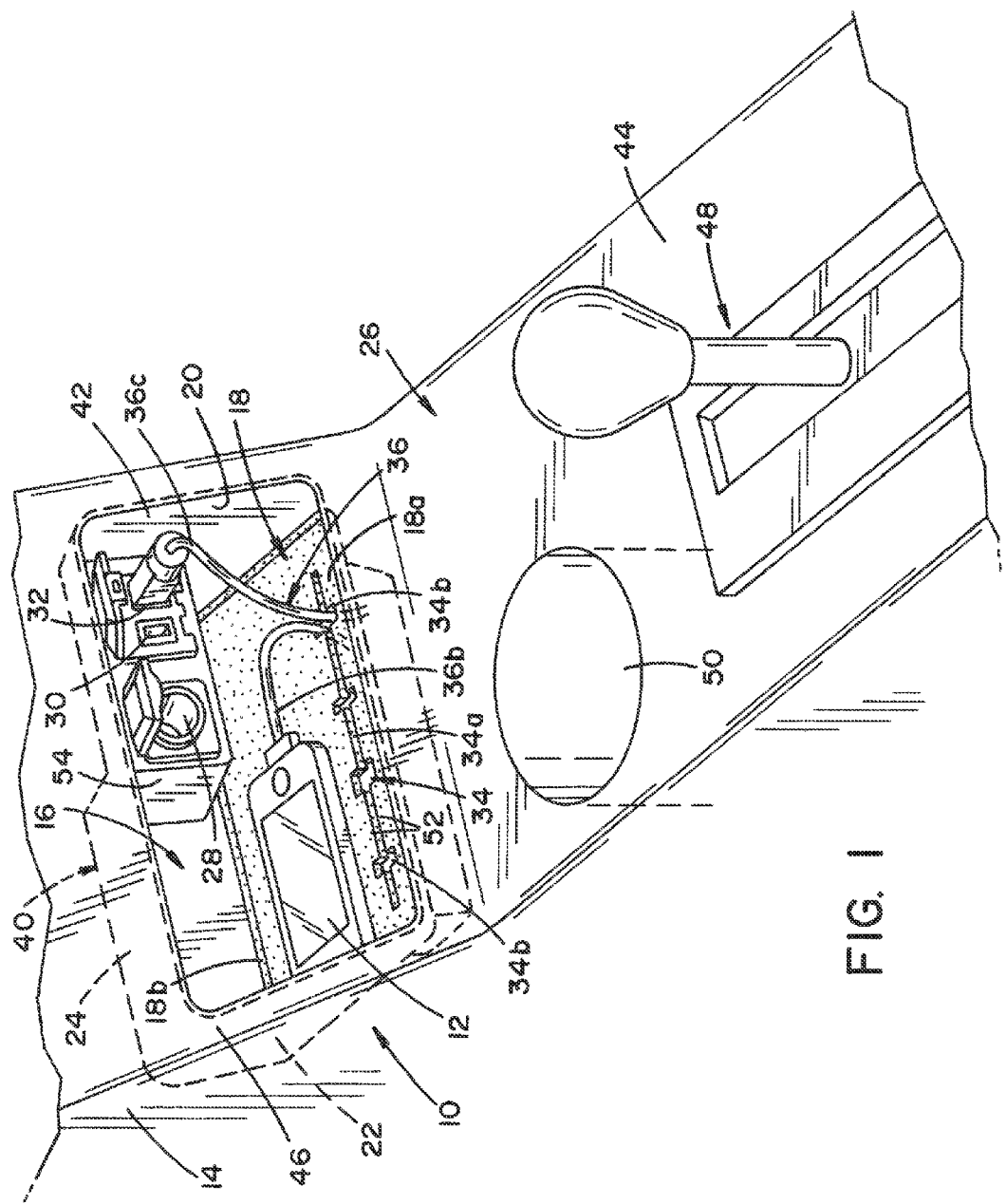
FIG. 1 is a perspective view of a console area pocket assembly according to one exemplary embodiment.
Figure 2:
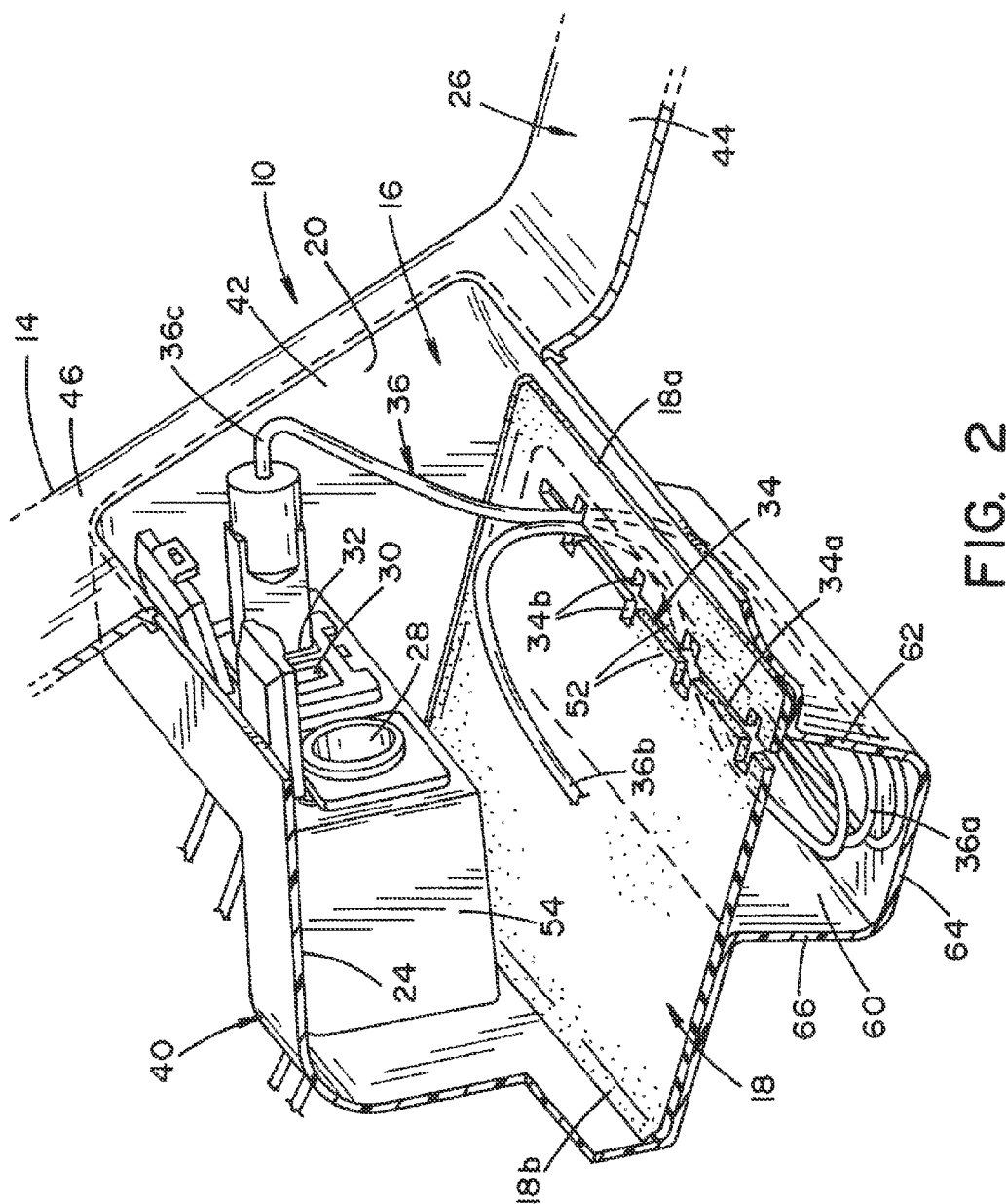
FIG. 2 is a cross-sectional perspective view of the pocket assembly of FIG. 1.
Figure 3:
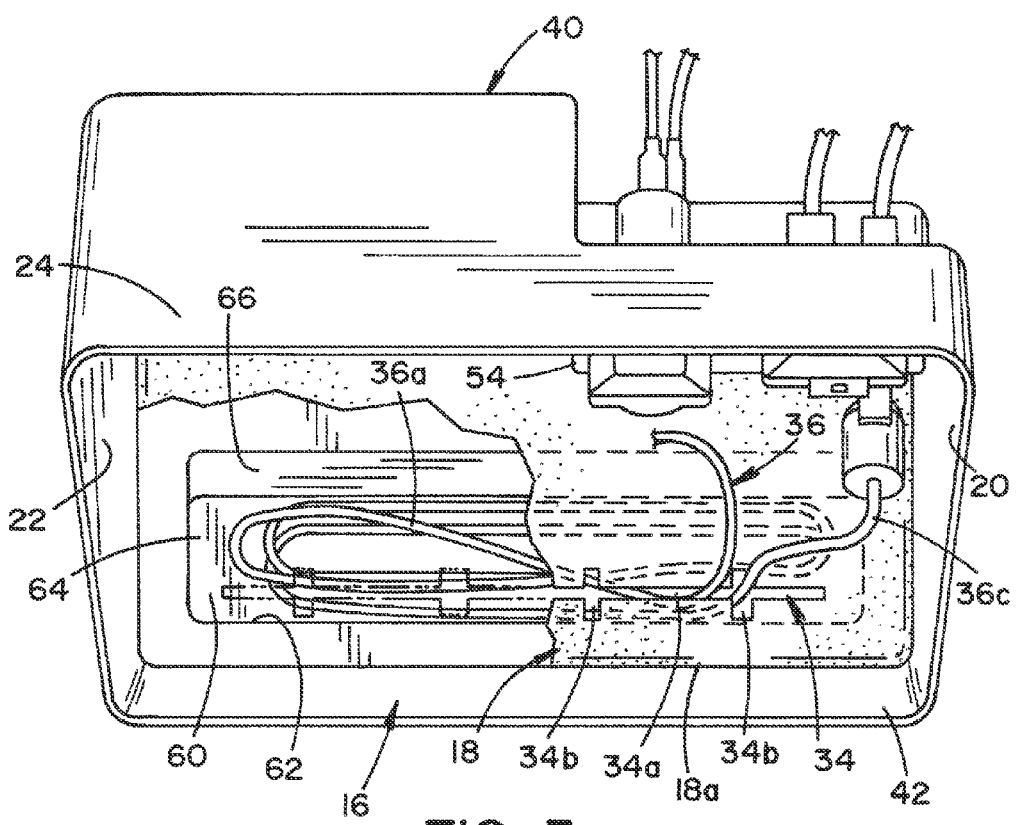
FIG. 3 is a top plan view of the pocket assembly shown removed from the vehicle and with a portion of a base wall removed to reveal an auxiliary storage compartment for receipt of an excess portion of a connecting cord.

Referring now to the drawings wherein the showings are for purposes of illustrating one or more exemplary embodiments and not for purposes of limiting same, FIG. 1 illustrates a vehicle pocket assembly 10 for accommodating a portable electronic device 12 in a vehicle 14 in which the pocket assembly 10 is disposed. As shown, the pocket assembly 10 includes or defines a storage compartment 16 disposed within the vehicle 14 that is defined by at least one wall, such as base wall 18, side walls 20, 22, and top wall 24 in the illustrated embodiment. As shown, the vehicle pocket assembly 10, and more particularly the storage compartment 16, can be recessed within or adjacent a center console 26 of the vehicle 14. The storage compartment 16 can be sized to fully accommodate the portable electronic device 12 entirely within the storage compartment 16.

The pocket assembly 10 additionally includes at least one port, such as ports 28, 30, 32 in the illustrated embodiment, disposed within the storage compartment 16 for operatively connecting to the portable electronic device 12 and/or to other portable electronic devices (not shown). In particular, the at least one port (e.g., one or more of the ports 28, 30, 32) can be connectable to the portable electronic device 12 via a suitable connecting cord, such as illustrated connecting cord 36. The at least one port (e.g., one or more of the ports 28, 30, 32) can be configured to provide at least one of electrical power to the portable electronic device 12 or communicate with the portable electronic device (i.e., signals can be sent, received and/or exchanged between the vehicle 14 and the portable electronic device 12) when the portable electronic device 12 is operatively connected thereto by the connecting cord 36. The ports 28, 30, 32 of the illustrated embodiment particularly include the port 28 configured as a cigarette lighter-style power adapter port and the ports 30, 32 each configured as USB ports; however, it is to be understood and appreciated by those skilled in the art that other types of ports could be provided and any number of ports could be provided (e.g., a single port, a pair of ports or more than three ports). For example, one of the ports could be configured as an audio input port (e.g., 3.5 mm headphone jack-type port), a general power port, etc.

The pocket assembly 10 further includes an aperture 34 defined in the at least one wall (e.g., the base wall 18 in the illustrated embodiment) for receiving an excess section or portion 36a of a connecting cord 36 adapted to operatively connect the portable electronic device 12 to the at least one port (e.g., the port 32 in the illustrated embodiment). As will be described in more detail below, the aperture 34 is conveniently arranged on the at least one wall (e.g., the base wall 18) and accommodates the excess portion 36a of the connecting cord 36 while a first end portion 36b of the connecting cord 36 is connected to the portable electronic device 12 and/or a second end portion 36c of the connecting cord is connected to the vehicle 14, such as through one of the ports 28, 30 and/or 32 (and could accommodate the excess portion 36a even when the connecting cord 36 is connected to neither of the portable device 12 and the vehicle 14). This advantageously removes the excess portion 36a of the connecting cord 36 from view and/or from being an obstruction within the vehicle 14.

As shown in the illustrated embodiment, the pocket assembly 10 can also include a housing 40 defining the storage compartment 16 that is arranged and configured to receive the portable electronic device 12. The storage compartment 16, and particularly the housing 40 defining the storage compartment 16, can have the base wall 18 (also referred to herein as a lower wall) arranged for supporting the portable electronic device 12, such as is shown in the illustrated embodiment. The aperture 34 of the illustrated embodiment is particularly defined through the base wall 18 for receiving the excess portion 36a of the connecting cord 36 therethrough to remove the excess portion 36a from the storage compartment 16 and/or to thereby declutter the storage compartment 16. More specifically, the storage compartment 16 can be formed by the housing 40 with an open end 42 disposed on a rearward side of the housing 40 (i.e., the open end facing in a rearward direction relative to the vehicle 14 and particularly relative to a direction of travel on the vehicle 14). Thus, the housing 40 of the illustrated embodiment defines the open end 42 directed rearwardly toward the center console 26. As shown, the base wall 18 can be particularly arranged to be generally horizontally oriented with a rearward edge 18a adjacent the open end 42.

Figure 4:
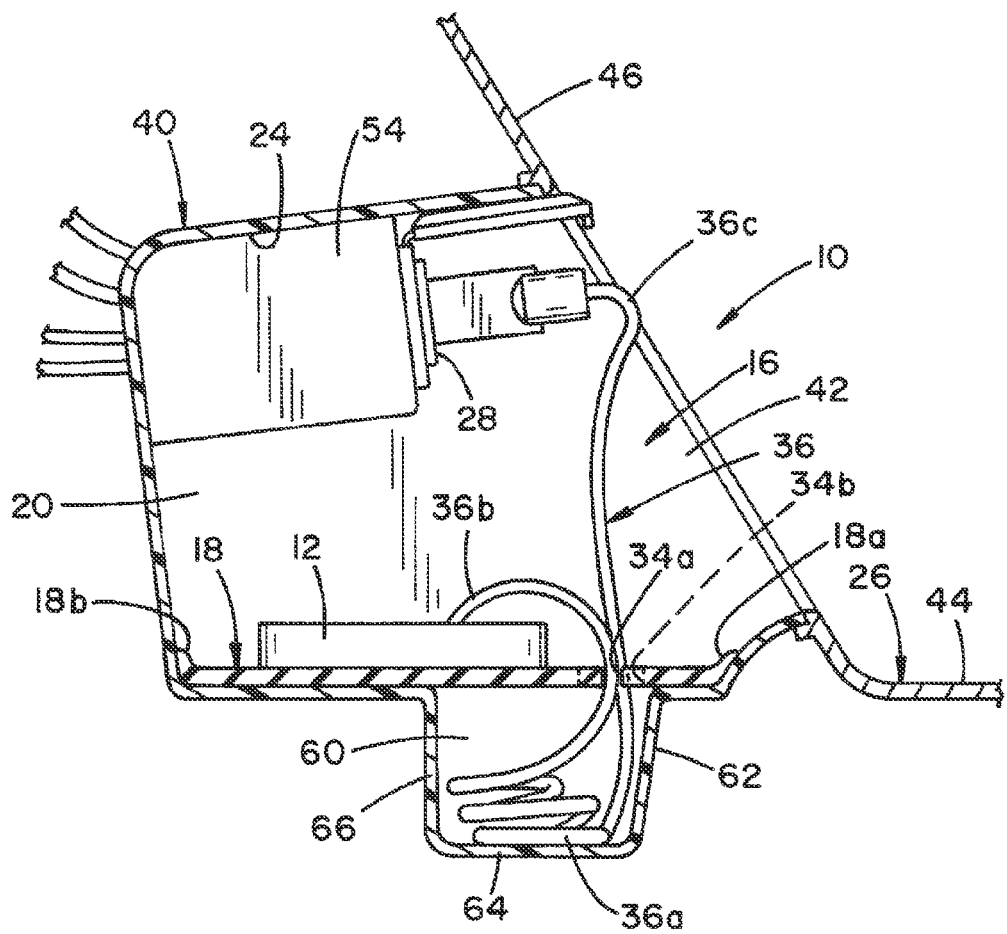
FIG. 4 is a side elevation cross-sectional view of the vehicle pocket assembly.

In addition, the at least one wall, and particularly the housing 40, can include the top wall 24 opposite and spaced apart from the base wall 18 and the sidewalls 20, 22 extending between the tope wall 24 and the base wall 18. In the illustrated embodiment, the center console 26 (also referred to herein as a center console area) includes a generally horizontal panel 44 and a forward panel 46 with the storage compartment 16 recessed within the forward panel 46 and the forward panel 46 extending vertically upward relative to the generally horizontal panel 44. As best shown in FIG. 4, the forward panel 46 can extend upwardly from the horizontal panel 44 at an oblique angle (e.g., 120 degrees from the upper surface of the horizontal panel to the upper surface of the forward panel 46). Alternatively, the forward panel can be arranged differently, such as extending approximately perpendicular relative to the horizontal panel 44 or at some other angle. Further, the storage compartment 16 need not be disposed in the forward panel 46 but could be disposed in the horizontal panel 44 or some other panel within the vehicle 14, if desired.

In the illustrated embodiment, the base wall 18 on which the portable electronic device 12 rests when received in the storage compartment 16 can be generally parallel to the horizontal panel 44. Additionally, a shift level assembly 48 and a cup holder 50 can provided in the center console 26, and particularly in the horizontal panel 44 of the center console 26 It is to be appreciated by those skilled in the art that these vehicle features need not be provided, need not be provided in the center console area and/or other vehicle features or components could be provided in the center console 26 (e.g., additional cup holders, recesses, storage compartments, etc.). In the illustrated embodiment, with the shift assembly 48 and the cup holder 50 provided in the horizontal panel 44, the vehicle pocket assembly 10 is arranged so as to be forwardly disposed relative to each of the shift assembly 48 and the cup holder 50. Moreover, the vehicle pocket assembly 10 is arranged at a forward portion of the center console 26 or can be considered as being disposed immediately forward of the center console 26.

As shown in the illustrated embodiment, the base wall 18 can have a rectangular configuration and the aperture 34 can have an elongated portion 34a (also referred to herein as the elongated section) that is elongated in a direction parallel to an elongation of the rectangular configuration of the base wall 18. In particular, the rearward edge 18a and a forward edge 18b of the base wall 18 (collectively, elongated edges 18a, 18b) can define the elongation or elongated extent of the rectangular configuration of the base wall 18. Thus, the aperture 34 is formed with the elongated portion 34a extending along a substantial width of the storage compartment (i.e., the width extending in a lateral direction across the vehicle). In addition, the aperture 34 is formed with at least one cross-slit portion 34b (also referred to herein as cross-slit sections). In the illustrated embodiment, the at least one cross-slit portion is a plurality of cross-slits 34b that are laterally spaced apart along the elongated portion 34a and are generally perpendicularly oriented relative to the elongated portion 34a. Also, in the illustrated embodiment, the cross-slit portions 34b have varying widths (i.e., the widths extending in the lateral direction across the vehicle) for accommodating cords (e.g., the cord 36) of different sizes, though this is not required.

In the illustrated embodiment, the base wall 18 is formed as a resilient mat that provides an increased friction co-efficient for the portable electronic device 12 when resting on the base wall 18. This prevents the portable electronic device 12 from sliding around within the storage compartment 16 during driving of the vehicle 14. Additionally, this allows easier insertion of the excess portion 36a of the connecting cord 36 into the aperture 34 since tabs 52 are defined in the base wall 18 by the elongated portion 34a and the cross-slits 34b and such tabs 52 are deformable to allow the cord to more easily pass through the aperture 34. Also in the illustrated embodiment, the at least one port (i.e., the ports 28, 30 and 32) is disposed adjacent the top wall 24 and spaced apart from the base wall 18. In particular, a protuberance portion 54 of the housing 40 extends downward from the top wall 24 into the storage compartment 16 toward the base wall 18 and can be positioned adjacent the side wall 20. The protuberance portion 54 provides a structure to which the ports 28, 30, 32 can be mounted or secured.

In the illustrated embodiment, the storage compartment 16 is a main storage compartment and the pocket assembly 10 further includes an auxiliary storage compartment 60 for receiving the excess portion 36a of the connecting cord 36 that is arranged below the main storage compartment 16. Thus, the aperture 34 enables the connecting cord 36 to be connected to the portable electronic device 12 and to the at least one port (e.g., the port 32) while having the excess portion 36a received in the auxiliary storage compartment 60. The auxiliary storage compartment 60 can be defined by at least one auxiliary wall (e.g., walls 62, 64, 66 in the illustrated embodiment) that is integrally formed with the at least one wall (i.e., walls 18, 20, 22, and 24 in the illustrated embodiment) defining the main storage compartment 16. More specifically, the housing 40 can be a unitary structure that defines the main storage compartment 16 and the auxiliary storage compartment 60. As shown, the auxiliary storage compartment 60 is defined immediately below the main storage compartment 16. Accordingly, in the illustrated embodiment, the base wall 18 separates the main storage compartment 16 and the auxiliary storage compartment 60 with the aperture 34 arranged to enable the connecting cord 36 to be connected to one of the ports 28, 30 or 32 and the portable electronic device 12 while the excess portion 36a of the connecting cord 36 is received in the auxiliary storage compartment 60.

In operation, the storage compartment 16 functions as an open pocket with the at least one port (i.e., the ports 28, 30, 32) accessibly provided in the vehicle 14. When a driver or vehicle occupant connects a portable electronic device 12 to one of the ports 28, 30 or 32, this person can push in excess portion 36a of a connecting cable 36 into the auxiliary storage compartment 60 through the aperture 34. This provides a clean appearance within the vehicle 14. Additionally, this also decreases the likelihood of the cables or any portions thereof associated with portable electronic devices from interfering with operation of features within the vehicle, such as for example, the shift assembly 48 and the cup holder 50 in the illustrated embodiment.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A pocket assembly for accommodating a portable electronic device in a vehicle, comprising:
   a storage compartment disposed within the vehicle and having at least one wall;
   at least one port disposed within the storage compartment for operatively connecting to the portable electronic device;
   an aperture defined through the at least one wall of the storage compartment for receiving a portion of a connecting cord which is adapted to operatively connect the portable electronic device to the at least one port; and
   an auxiliary storage compartment arranged below the storage compartment for housing the portion of the connecting cord, the aperture providing the only access to the auxiliary storage compartment,
   wherein the at least one wall includes a base wall on which the portable electronic device rests when received within the storage compartment, the base wall defining the aperture therethrough,
   wherein the base wall has a rectangular configuration and the aperture has an elongated portion that is elongated in a direction parallel to an elongation of the rectangular configuration,
   wherein the aperture includes at least one cross slit portion oriented generally perpendicularly to the elongated portion.

2. The pocket assembly of claim 1 wherein the storage compartment is recessed within or adjacent a center console of the vehicle.

3. The pocket assembly of claim 2 wherein the center console includes a generally horizontal panel and the storage compartment is recessed within a forward panel extending vertically upward relative to the generally horizontal panel.

4. The pocket assembly of claim 3 wherein the base wall is a lower wall that is generally parallel to the generally horizontal panel.

5. The pocket assembly of claim 1 wherein the at least one port is configured to provide at least one of electrical power to the portable electronic device or communicate with the portable electronic device when the portable electronic device is operatively connected thereto by the connecting cord.

6. The pocket assembly of claim 1 wherein the at least one cross slit portion is a plurality of cross slit portions laterally spaced along the elongated portion of the aperture.

7. The pocket assembly of claim 1 wherein the base wall includes a resilient mat that provides an increased friction coefficient for the portable electronic device when resting on the base wall.

8. The pocket assembly of claim 1 wherein the at least one wall includes a top wall opposite and spaced apart from the base wall, the at least one port disposed adjacent the top wall and spaced apart from the base wall.

9. The pocket assembly of claim 1 wherein the storage compartment is a main storage compartment, the aperture enabling the connecting cord to be connected to the portable electronic device and to the at least one port while having the portion received in the auxiliary storage compartment, the auxiliary storage compartment defined by at least one auxiliary wall that is integrally formed with the at least one wall defining the main storage compartment.

10. The pocket assembly of claim 1 wherein the storage compartment is sized to fully accommodate the portable electronic device entirely within the storage compartment.

11. A console pocket assembly for a vehicle, comprising:
    a storage compartment having a base wall for supporting a portable electronic device;
    a port disposed within the storage compartment that is connectable to the portable electronic device via a connecting cord; and
    an aperture defined through the base wall for receiving a section of the connecting cord, the aperture includes an elongated section extending along a substantial width of the storage compartment and a plurality of spaced apart cross slits.

12. The console pocket assembly of claim 11 wherein the storage compartment is formed by a housing with an open end disposed on a rearward side of the housing, and wherein the base wall has a rearward edge adjacent the open end.

13. The console pocket assembly of claim 12 wherein the storage compartment is a main storage compartment and wherein the housing defines an auxiliary storage compartment immediately below the main storage compartment, the base wall separating the main storage compartment and the auxiliary storage compartment with the aperture arranged to enable the connecting cord to be connected to the port and the portable electronic device while the section of the connecting cord is received in the auxiliary storage compartment.

14. The console pocket assembly of claim 13 wherein the base wall includes a resilient material.

* * * * *